US012620255B2

(12) United States Patent
Inoshita

(10) Patent No.: US 12,620,255 B2
(45) Date of Patent: May 5, 2026

(54) IMAGE PROCESSING APPARATUS, IMAGE PROCESSING METHOD, AND NON-TRANSITORY STORAGE MEDIUM

(71) Applicant: NEC Corporation, Tokyo (JP)

(72) Inventor: Tetsuo Inoshita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 372 days.

(21) Appl. No.: 18/215,337

(22) Filed: Jun. 28, 2023

(65) Prior Publication Data

US 2024/0013566 A1 Jan. 11, 2024

(30) Foreign Application Priority Data

Jul. 5, 2022 (JP) ................................ 2022-108465

(51) Int. Cl.

| | |
|---|---|
| ***G06T 7/50*** | (2017.01) |
| ***G06T 7/70*** | (2017.01) |
| ***G06T 7/90*** | (2017.01) |
| ***G06V 40/10*** | (2022.01) |

(52) U.S. Cl.

CPC .............. *G06V 40/107* (2022.01); *G06T 7/50* (2017.01); *G06T 7/70* (2017.01); *G06T 7/90* (2017.01); *G06T 2207/10024* (2013.01); *G06V 2201/07* (2022.01)

(58) Field of Classification Search

CPC .. G06V 40/107; G06V 2201/07; G06V 20/52; G06T 7/50; G06T 7/70; G06T 7/90; G06T 2207/10024

USPC .......................................................... 382/103

See application file for complete search history.

(56) References Cited

U.S. PATENT DOCUMENTS

| | | | | |
|---|---|---|---|---|
| 10,059,002 | B2 * | 8/2018 | Miyatani .............. | G06V 10/993 |
| 2008/0028486 | A1 * | 1/2008 | Ryan .................... | C07K 14/415<br>800/278 |
| 2009/0252375 | A1 * | 10/2009 | Rekimoto ............. | G06F 3/0425<br>382/103 |
| 2011/0013805 | A1 * | 1/2011 | Okada .................... | G06V 10/56<br>382/103 |
| 2019/0287212 | A1 * | 9/2019 | Yanagisawa ........... | G06V 40/10 |
| 2023/0419734 | A1 * | 12/2023 | Yamazaki ...... | G06Q 10/063114 |

FOREIGN PATENT DOCUMENTS

| | | | |
|---|---|---|---|
| JP | 2020-135767 | A | 8/2020 |
| JP | 2020-177533 | A | 10/2020 |
| JP | 2020-184250 | A | 11/2020 |

* cited by examiner

*Primary Examiner* — Ali Bayat

(74) *Attorney, Agent, or Firm* — Sughrue Mion, PLLC

(57) ABSTRACT

To accurately determine a work content at an image capturing time point by an image analysis, the present invention provides an image processing apparatus 10 including an acquisition unit 11 that acquires an image, a detection unit 12 that detects a hand of a person and a work target object from the image, and a determination unit 13 that determines, based on a relative position relation within the image between the detected hand of the person and the detected work target object, a work content at a time point when the image is captured.

19 Claims, 13 Drawing Sheets

EVALUATION INFORMATION

NOT EXECUTE WORK
(30%, ABOUT 1 HOUR
AND 35 MINUTES)

EXECUTE WORK
(70%, ABOUT 3 HOURS AND 40 MINUTES)

TOTAL TIME 5 HOURS AND 15 MINUTES
(1:00 P.M. TO 6:15 P.M.)

EVALUATION INFORMATION

NOT EXECUTE WORK
(30%, ABOUT 1 HOUR
AND 35 MINUTES)

EXECUTE WORK A
(45%, ABOUT 2 HOURS
AND 22 MINUTES)

EXECUTE WORK C
(10%, ABOUT
31 MINUTES)

EXECUTE WORK B
(15%, ABOUT
47 MINUTES)

TOTAL TIME 5 HOURS AND 15 MINUTES
(1:00 P.M. TO 6:15 P.M.)

EVALUATION INFORMATION

IMAGE PROCESSING APPARATUS, IMAGE PROCESSING METHOD, AND NON-TRANSITORY STORAGE MEDIUM

This application is based upon and claims the benefit of priority from Japanese patent application No. 2022-108465, filed on Jul. 5, 2022, the disclosure of which is incorporated herein in its entirety by reference.

TECHNICAL FIELD

The present invention relates to an image processing apparatus, an image processing method, and a program.

BACKGROUND ART

Techniques being related to the present invention are disclosed in Patent Documents 1 to 3.

Patent Document 1 (Japanese Patent Application Publication No. 2020-184250) discloses a technique for detecting a position and an orientation of a worker, determining, based on a detection result, which worktable the worker works on, and measuring, based on a determination result, a work time at each worktable.

Patent Document 2 (Japanese Patent Application Publication No. 2020-135767) discloses a technique for detecting a position of a worker and a position of a target object, determining that work is being performed when the positions of the worker and the target object are associated with each other, and measuring a work time.

Patent Document 3 (Japanese Patent Application Publication No. 2020-177533) discloses a technique for measuring a work time, based on an image capturing a hand of a worker. The technique preliminarily registers, as a background image, a state where work is not performed and there is no motion on a worktable, determines, to be a working state, a state where there is a difference from the background image, and determines, to be a non-working state, a state where there is no difference from the background image. Then, the technique measures a work time, based on a result of the determination.

DISCLOSURE OF THE INVENTION

A technique for determining a work content at an image capturing time point by an image analysis is desired. For example, measurement of a work time of each piece of work or the like can be performed by utilizing the technique. However, it is not easy to accurately determine a work content at an image capturing time point by an image analysis.

A technique disclosed in Patent Document 1 measures a work time at each worktable, based on a position and an orientation of a worker. However, a situation where, even when a worker is directed toward a certain worktable near the worktable, work is not performed actually can occur. In determination based on a position and an orientation of a worker, a work content of the worker cannot be accurately determined.

A technique disclosed in Patent Document 2 determines that work is being performed when a position of a worker and a position of a target object are associated with each other, and measures a work time. However, a situation where, even when a worker and a target object are present in the same work space, work is not performed actually can occur. In determination based on a position relation between a worker and a target object, a work content of the worker cannot be accurately determined.

A technique disclosed in Patent Document 3 determines, to be a working state, a state where there is a difference from a background image, and determines, to be a non-working state, a state where there is no difference from the background image. In this case, for example, a state where only a hand of a worker put on a worktable is captured, a state where only an object put on a worktable is captured, or the like is also determined to be a working state. In determination based on a difference from a background image, a work content of the worker cannot be accurately determined.

In view of the problem described above, one example of an object of the present invention is to provide an image processing apparatus, an image processing method, and a program that solve a subject of accurately determining a work content at an image capturing time point by an image analysis.

One aspect of the present invention provides an image processing apparatus including:

- an acquisition unit that acquires an image;
- a detection unit that detects a hand of a person and a work target object from the image; and
- a determination unit that determines, based on a relative position relation within the image between the detected hand of the person and the detected work target object, a work content at a time point when the image is captured.

One aspect of the present invention provides an image processing method including, by one or more computers:

- acquiring an image;
- detecting a hand of a person and a work target object from the image; and
- determining, based on a relative position relation within the image between the detected hand of the person and the detected work target object, a work content at a time point when the image is captured.

One aspect of the present invention provides a program causing a computer to function as:

- an acquisition unit that acquires an image;
- a detection unit that detects a hand of a person and a work target object from the image; and
- a determination unit that determines, based on a relative position relation within the image between the detected hand of the person and the detected work target object, a work content at a time point when the image is captured.

One aspect of the present invention achieves an image processing apparatus, an image processing method, and a program that solve a subject of accurately determining a work content at an image capturing time point by an image analysis.

BRIEF DESCRIPTION OF THE DRAWINGS

The above-described object, other objects, features, and advantageous effects will become more apparent from a preferred example embodiment described below and the following accompanying drawings.

DESCRIPTION OF EMBODIMENTS

Hereinafter, example embodiments of the present invention are described by use of the drawings. Note that, in all of the drawings, a similar component is assigned with a similar reference sign, and description thereof is omitted as appropriate.

First Example Embodiment

Figure 1:
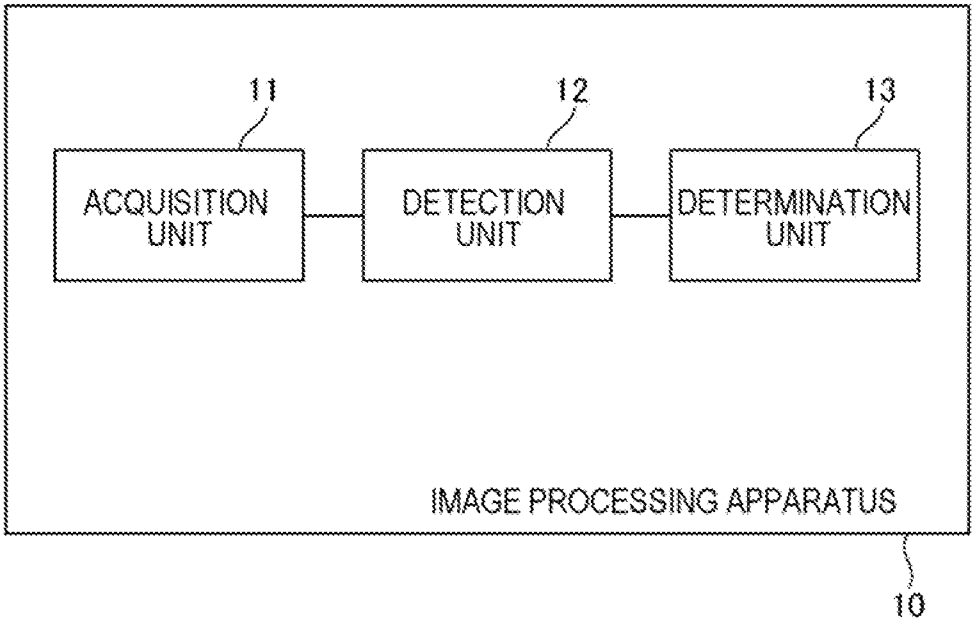
FIG. 1 is a diagram illustrating one example of a functional block diagram of an image processing apparatus.

FIG. 1 is a functional block diagram illustrating an outline of an image processing apparatus 10 according to a first example embodiment. The image processing apparatus 10 includes an acquisition unit 11, a detection unit 12, and a determination unit 13.

The acquisition unit 11 acquires an image. The detection unit 12 detects a hand of a person and a work target object from the acquired image. The determination unit 13 determines, based on a relative position relation within the image between the detected hand of the person and the detected work target object, a work content at a time point when the image is captured.

The image processing apparatus 10 including such a configuration solves a subject of accurately determining a work content at an image capturing time point by an image analysis.

Second Example Embodiment

"Outline"

An image processing apparatus 10 according to a second example embodiment is a more specific form of the image processing apparatus 10 according to the first example embodiment.

The image processing apparatus 10 according to the present example embodiment detects a "hand of a person" and a "work target object" from an image, and determines, based on a "relative position relation within the image" between the detected "hand of the person" and the "work target object", a "work content" at a time point when the image is captured, specifically, whether work is performed.

The image processing apparatus 10 according to the present example embodiment can highly accurately determine a work content in work in which some treatment is performed on a work target object by use of a hand of a person. A configuration of the image processing apparatus 10 is described in more detail below.

"Hardware Configuration"

Next, one example of a hardware configuration of the image processing apparatus 10 is described. Each functional unit of the image processing apparatus 10 is achieved by any combination of hardware and software mainly including a central processing unit (CPU) of any computer, a memory, a program loaded onto the memory, a storage unit such as a hard disk that stores the program (that can store not only a program previously stored from a phase of shipping an apparatus but also a program downloaded from a storage medium such as a compact disc (CD), a server on the Internet, and the like), and an interface for network connection. Then, it is appreciated by a person skilled in the art that there are a variety of modified examples of a method and an apparatus for the achievement.

Figure 2:
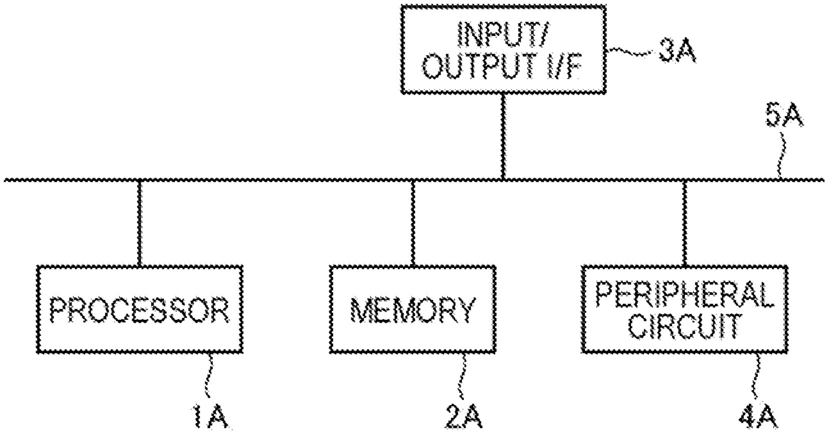
FIG. 2 is a diagram illustrating one example of a hardware configuration of the image processing apparatus.

FIG. 2 is a block diagram illustrating a hardware configuration of the image processing apparatus 10. As illustrated in FIG. 2, the image processing apparatus 10 includes a processor 1A, a memory 2A, an input/output interface 3A, a peripheral circuit 4A, and a bus 5A. The peripheral circuit 4A includes various modules. The image processing apparatus 10 may not include the peripheral circuit 4A. Note that, the image processing apparatus 10 may be configured by a plurality of physically and/or logically separated apparatuses. In this case, each of the plurality of apparatuses can include the hardware configuration described above.

The bus 5A is a data transmission path for the processor 1A, the memory 2A, the peripheral circuit 4A, and the input/output interface 3A to mutually transmit and receive data. The processor 1A is, for example, an arithmetic processing apparatus such as a CPU and a graphics processing unit (GPU). The memory 2A is, for example, a memory such as a random access memory (RAM) and a read only memory (ROM). The input/output interface 3A includes an interface for acquiring information from an input apparatus, an external apparatus, an external server, an external sensor, a camera, and the like, an interface for outputting information to an output apparatus, an external apparatus, an external server, and the like, and the like. The input apparatus is, for example, a keyboard, a mouse, a microphone, a physical button, a touch panel, and the like. The output apparatus is, for example, a display, a speaker, a printer, a mailer, and the like. The processor 1A can give an instruction to each of modules, and perform an arithmetic operation, based on an arithmetic result of each of the modules.

"Functional Configuration"

Next, a functional configuration of the image processing apparatus 10 according to the second example embodiment is described in detail. FIG. 1 illustrates one example of the functional block diagram of the image processing apparatus 10. As illustrated, the image processing apparatus 10 includes an acquisition unit 11, a detection unit 12, and a determination unit 13.

The acquisition unit 11 acquires an image captured by a camera (an image file generated by a camera). For example, the acquisition unit 11 may acquire, by real-time processing, an image captured by a camera. In this case, the image processing apparatus 10 and the camera are communicably connected in a wired and/or wireless way. Otherwise, the acquisition unit 11 may acquire, by batch processing, an image captured by a camera. In this case, the image captured by the camera is collectively input to the image processing apparatus 10 by any means.

The camera may capture a moving image, or may capture a still image. The camera may continuously capture a still image at a predetermined time interval (example: every 1 second, every 10 seconds, every 30 seconds, every 1 minute, every 30 minutes, every 1 hour, or the like), or may capture a still image according to an operation of a user.

The camera is configured in such a way as to capture a work target object targeted for work. For example, the camera may be installed in a position and an orientation in which a place (e.g., a worktable, a work desk, a work space, or the like) where a work target object targeted for work is placed is captured. Otherwise, a wearable terminal worn by a worker may include a camera.

A "work target object" is an object to be targeted for work, and a kind thereof is not particularly limited. For example, an intermediate product or a finished product of a product to be manufactured may become a work target object. In this case, assembly, mounting of a component, soldering, screw fastening, an operation test, or the like becomes a piece of work. Otherwise, a product targeted for maintenance (repair, cleaning, or the like) may become a work target object. In this case, disassembly, assembly, demounting of a component, mounting of a component, soldering, screw unfastening, screw fastening, an operation test, or the like becomes a piece of work. Note that, the work target object and the piece of work exemplified herein are merely one example, and the present invention is not limited thereto.

Figure 3:
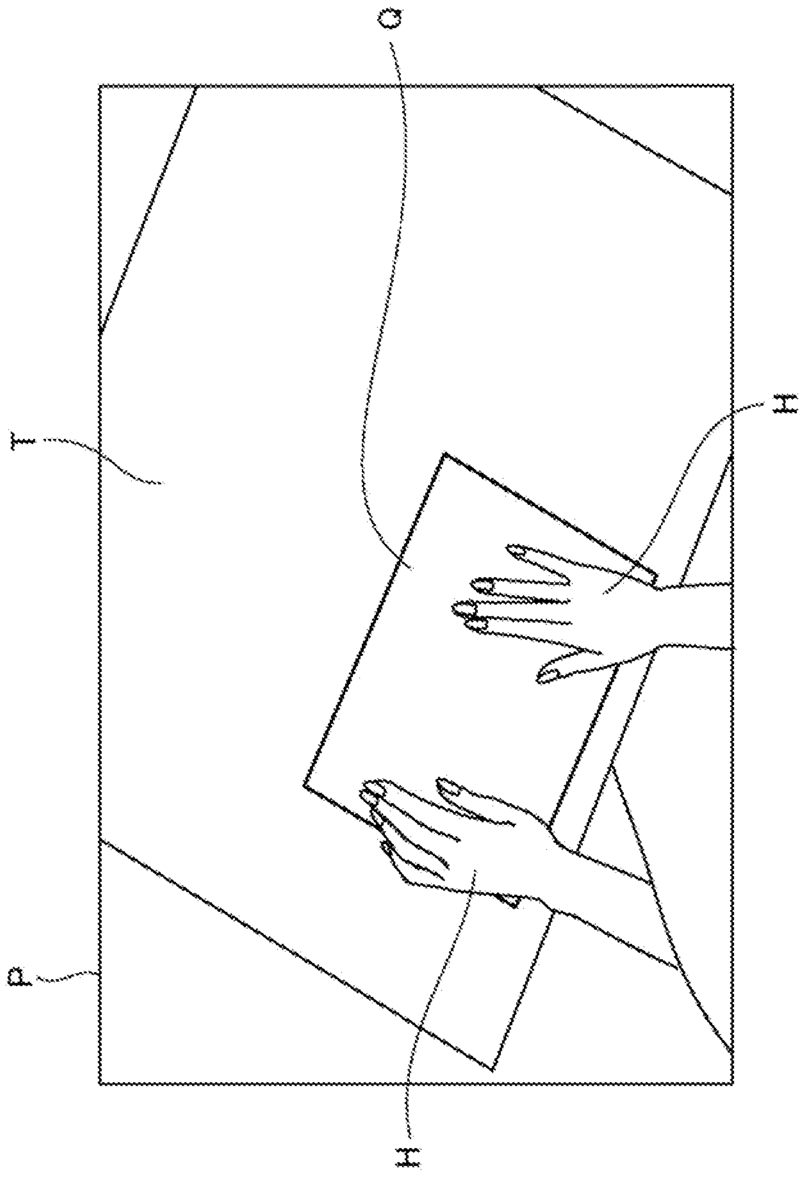
FIG. 3 is a diagram illustrating one example of an image processed by the image processing apparatus.

FIG. 3 illustrates one example of an image P acquired by the acquisition unit 11. The illustrated image P is an image captured by a wearable terminal worn by a worker. In the image P, a worktable T, a substrate being a work target object Q placed on the worktable T, and a hand H of a worker are captured.

Returning to FIG. 1, the detection unit 12 detects a hand of a person and a work target object from an image acquired by the acquisition unit 11. The detection unit 12 detects a hand of a person and a work target object from an image, based on a feature value of appearance. Processing of detecting a detection target object from an image, based on a feature value of appearance, is widely known, and any technique can be adopted in the present example embodiment. For example, a reference image of a detection target object may be previously registered, and the detection target object may be detected from an image of a processing target by collation processing between the reference image and the image of the processing target.

Figure 4:
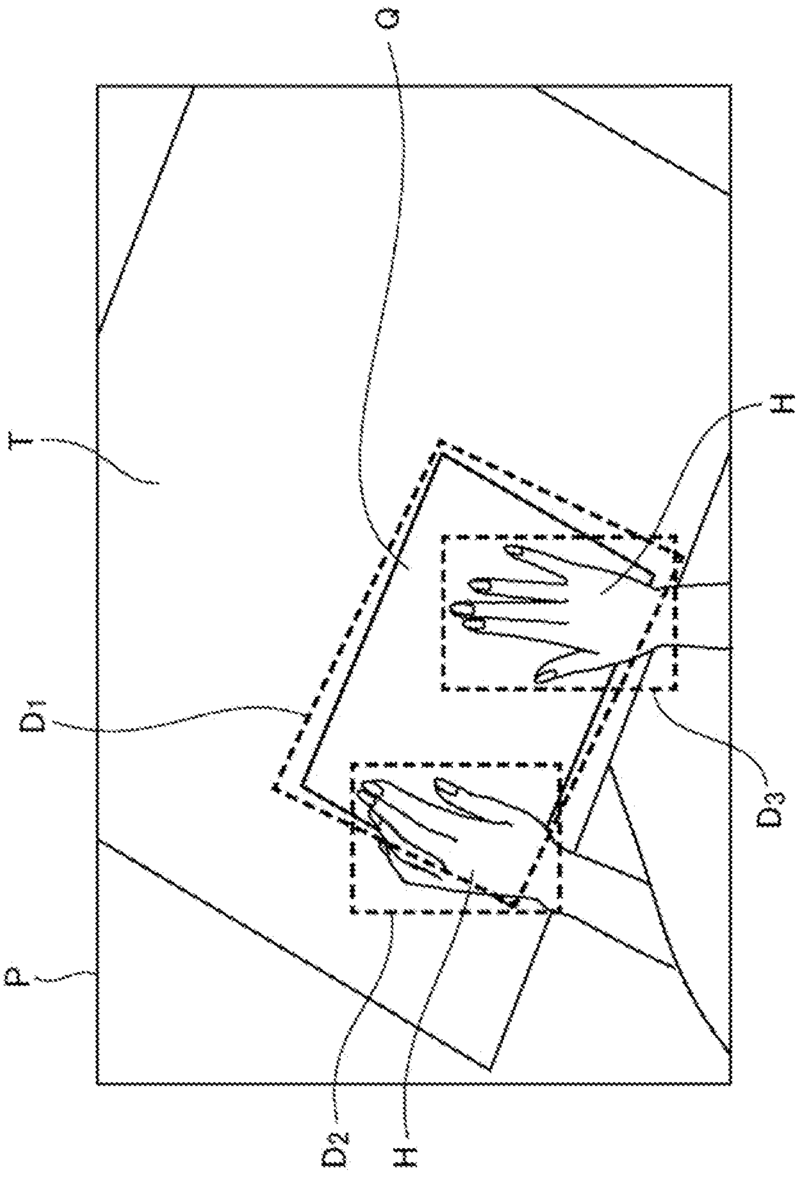
FIG. 4 is a diagram illustrating an analysis content of an image by the image processing apparatus.

As illustrated in FIG. 4, the detection unit 12 detects detection regions $D_1$ to $D_3$ each including the hand H of a person and the work target object Q. Each of the detection regions $D_1$ to $D_3$ may be a rectangular region as illustrated in FIG. 4, or may be a region along a contour of the hand H of the person and the work target object Q. In a case of FIG. 4, the detection region $D_1$ is a region in which the work target object Q is detected, and each of the detection regions $D_2$ and $D_3$ is a region in which the hand H is detected.

Returning to FIG. 1, the determination unit 13 determines, based on a relative position relation within the image between the detected hand of the person and the detected work target object, a work content at a time point when the image is captured. In the present example embodiment, the determination unit 13 determines whether work is performed at a time point when an image is captured.

The determination unit 13 determines that work is performed when the relative position relation satisfies a first condition, and determines that work is not performed when the relative position relation does not satisfy the first condition.

The first condition includes at least one of

"a detection region including a work target object" and at least one of "a detection region including a hand" overlap each other, "a detection region including a work target object" and two "detection regions each including a hand" overlap each other, a distance within an image between "a detection region including a work target object" and at least one of "a detection region including a hand" is equal to or less than a threshold value, and a distance within an image between "a detection region including a work target object" and two "detection regions each including a hand" is equal to or less than a threshold value.

A distance within an image between "a detection region including a work target object" and a "detection region including a hand" can be a distance between representative points of each region. A way of determining a representative point of each region is any way, and, for example, a center of a region may be determined to be a representative point, one of four vertices may be determined to be a representative point in a case of a rectangle, or a representative point may be determined in another method.

Note that, when at least one of a hand of a person and a work target object is not detected from an image, the determination unit 13 can determine that work is not performed at a time point when the image is captured.

Figure 5:
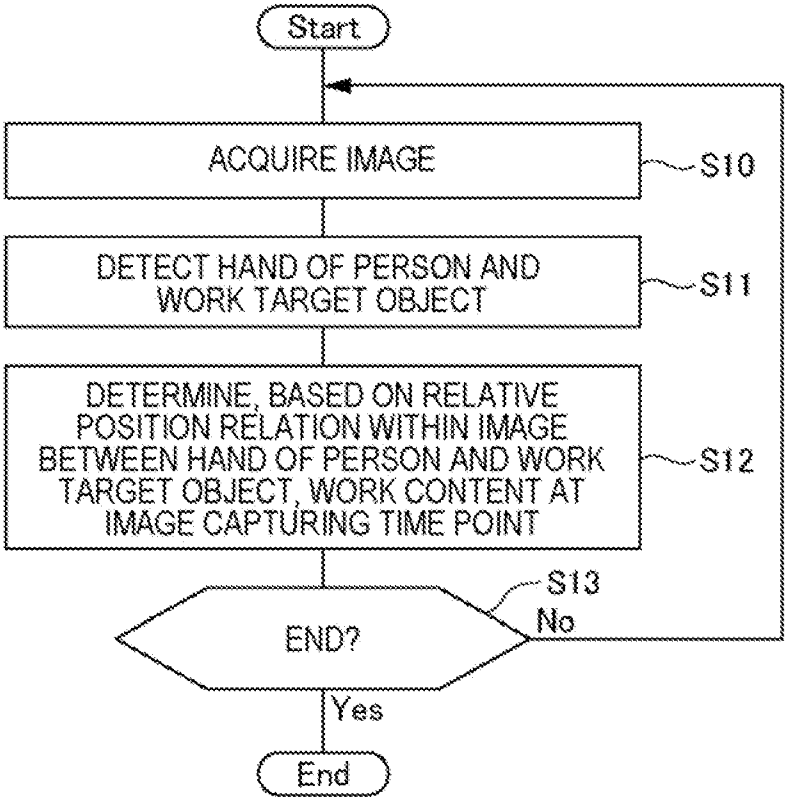
FIG. 5 is a flowchart illustrating one example of a flow of processing in the image processing apparatus.

Next, one example of a flow of processing in the image processing apparatus 10 is described by use of a flowchart in FIG. 5.

When an image is acquired (S10), the image processing apparatus 10 detects a hand of a person and a work target object from the acquired image (S11). Then, the image processing apparatus 10 determines, based on a relative position relation within the image between the detected hand of the person and the detected work target object, a work content at a time point when the image is captured, specifically, whether work is performed (S12).

Figure 6:
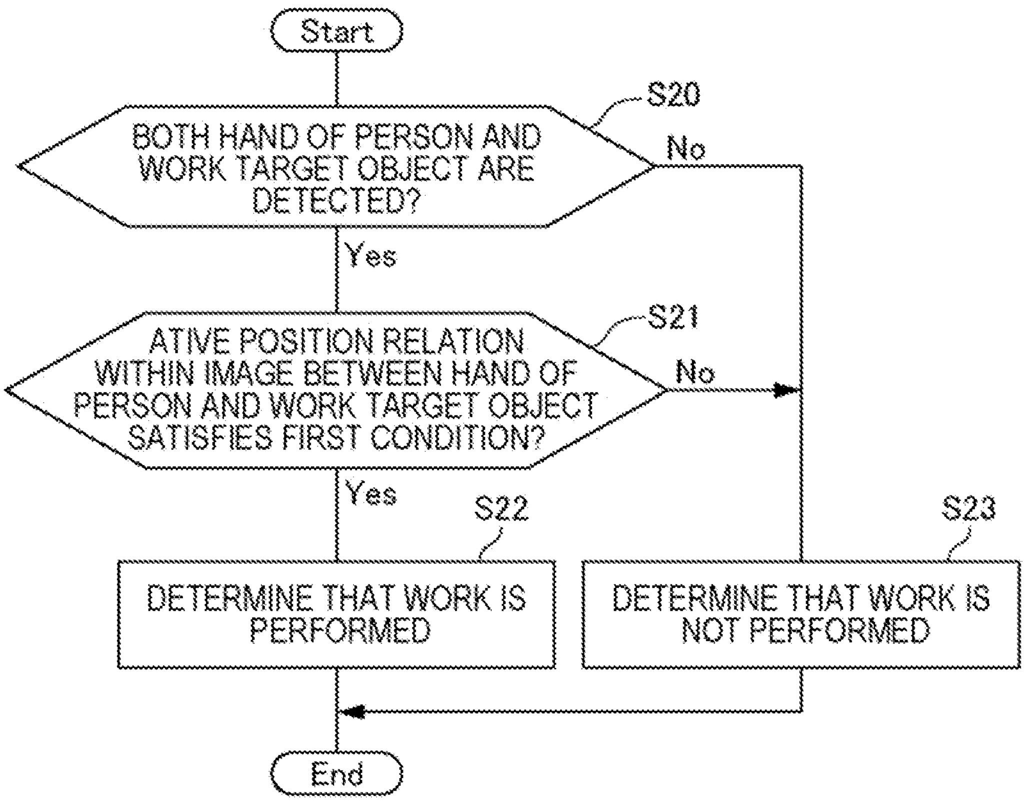
FIG. 6 is a flowchart illustrating another example of a flow of processing in the image processing apparatus.

Herein, one example of processing in S12 is described by use of a flowchart in FIG. 6.

In S12, the image processing apparatus 10 determines whether both a hand of a person and a work target object are detected (S20). When at least one of a hand of a person and a work target object is not detected (No in S20), the image processing apparatus 10 determines that work is not performed at a time point when the image is captured (S23).

On the other hand, when both a hand of a person and a work target object are detected (Yes in S20), the image processing apparatus 10 determines whether a relative position relation within the image between the detected hand of the person and the detected work target object satisfies the first condition (S21). The first condition is as described above.

When a relative position relation within the image between the detected hand of the person and the detected work target object satisfies the first condition (Yes in S21), the image processing apparatus 10 determines that work is performed at the time point when the image is captured (S22).

On the other hand, when a relative position relation within the image between the detected hand of the person and the detected work target object does not satisfy the first condition (No in S21), the image processing apparatus 10 determines that work is not performed at the time point when the image is captured (S23).

"Advantageous Effect"

The image processing apparatus 10 according to the present example embodiment detects a "hand of a person" and a "work target object" from an image, and determines, based on a "relative position relation within the image" between the detected "hand of the person" and the detected "work target object", a "work content" at a time point when the image is captured, specifically, whether work is performed. Such an image processing apparatus 10 according to the present example embodiment can highly accurately determine a work content in work in which some treatment is performed on a work target object by use of a hand of a person, specifically, whether work is performed.

Third Example Embodiment

An image processing apparatus 10 according to the present example embodiment includes a function of determining a work content at a time point when each of a plurality of time-series images is captured, and generating, based on a result of the determination, evaluation information indicating an evaluation content of work. Details are described below.

Figure 7:
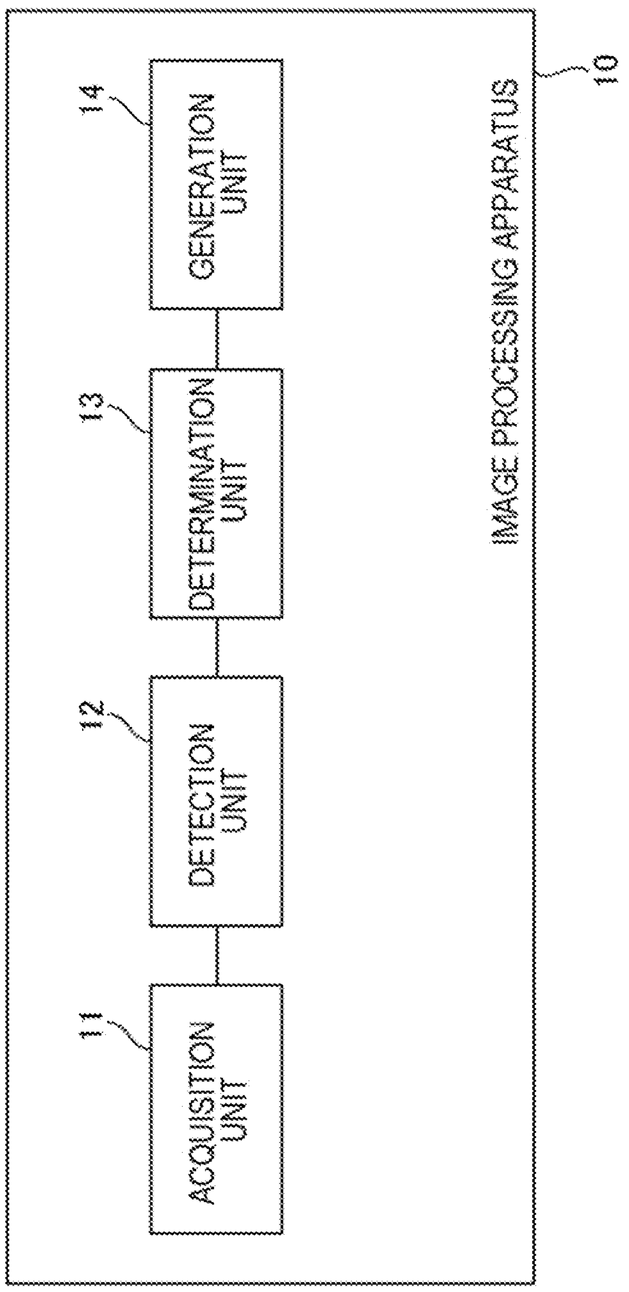
FIG. 7 is a diagram illustrating another example of a functional block diagram of the image processing apparatus.

One example of a functional block diagram of the image processing apparatus 10 according to the present example embodiment is illustrated in FIG. 7. As illustrated, the image processing apparatus 10 includes an acquisition unit 11, a detection unit 12, a determination unit 13, and a generation unit 14.

The acquisition unit 11 acquires a plurality of time-series images. For example, the acquisition unit 11 may acquire a moving image being constituted of a plurality of time-series frame images. Otherwise, the acquisition unit 11 may acquire a plurality of time-series still images continuously captured at a predetermined time interval (example: every 1 second, every seconds, every 30 seconds, every 1 minute, every 30 minutes, every 1 hour, or the like).

The detection unit 12 processes each of the plurality of time-series images, and detects a hand of a person and a work target object from each of the plurality of time-series images.

The determination unit 13 determines, based on a detection result of each of the plurality of time-series images in the detection unit 12, a work content at a time point when each of the plurality of time-series images is captured, specifically, whether work is performed.

The generation unit 14 generates evaluation information indicating an evaluation content of work, based on a determination result of a work content at a time point when each of the plurality of time-series images is captured, specifically, whether work is performed. The generation unit 14 generates, based on a determination result of whether work is performed at a time point when each of the plurality of time-series images is captured, evaluation information indicating at least one of a total time in which work is performed, and a total time in which work is not performed.

Figure 8:
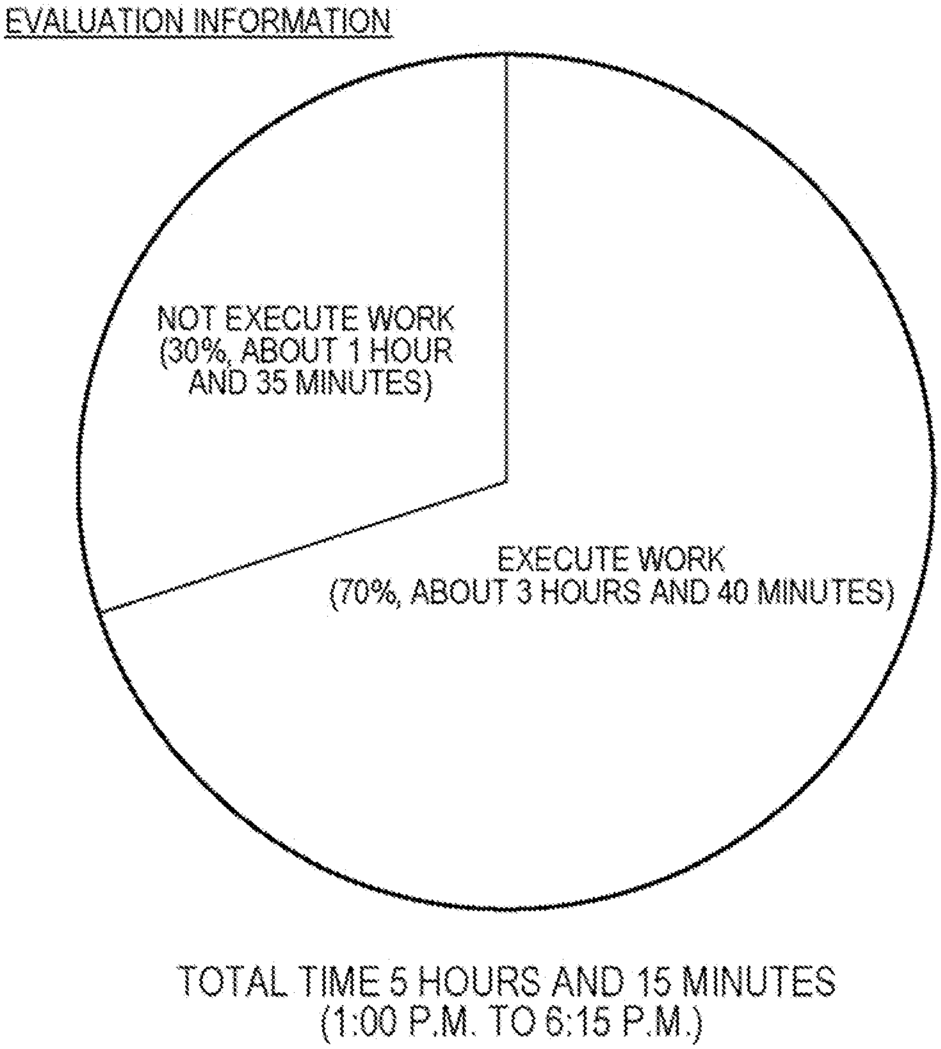
FIG. 8 is a diagram illustrating one example of evaluation information generated by the image processing apparatus.

FIG. 8 illustrates one example of evaluation information generated by the generation unit 14. The evaluation information illustrated in FIG. 8 indicates a time period (1:00 p.m. to 6:15 p.m.) of an evaluation target, and a total time thereof (5 hours and 15 minutes). A time period of an evaluation target can be determined to be any time period by a user. The generation unit 14 generates evaluation information, based on an analysis result of an image captured in a time period of an evaluation target.

Moreover, the evaluation information illustrated in FIG. 8 indicates a total time (about 3 hours and 40 minutes) in which work is performed, and a total time (about 1 hour and 35 minutes) in which work is not performed. Moreover, the evaluation information illustrated in FIG. 8 indicates a proportion (70%) of a time in which work is performed and a proportion (30%) of a time in which work is not performed, to the total time (5 hours and 15 minutes) described above. Moreover, the evaluation information illustrated in FIG. 8 indicates, with a pie graph, a ratio (7:3) between a time in which work is performed and a time in which work is not performed.

Other components of the image processing apparatus 10 according to the present example embodiment are similar to those according to the first and second example embodiments.

The image processing apparatus 10 according to the present example embodiment achieves an advantageous effect similar to that according to the first and second example embodiments. Moreover, the image processing apparatus 10 according to the present example embodiment can generate evaluation information indicating at least one of a total time in which work is performed, and a total time in which work is not performed, based on a determination result of a work content at a time point when each of a plurality of time-series images is captured. A user can recognize, based on the evaluation information, how much time a worker performs work and how much time a worker does not perform work within a time period of an evaluation target.

Moreover, as illustrated in FIG. 8, the image processing apparatus 10 can also generate evaluation information indicating a ratio (7:3) between a total time in which work is performed and a total time in which work is not performed. A user can recognize, based on the evaluation information, the ratio between a total time in which work is performed and a total time in which work is not performed.

Fourth Example Embodiment

The image processing apparatus 10 according to each of the second and third example embodiments determines "whether work is performed", as a work content at a time point when an image is captured. An image processing apparatus 10 according to the present example embodiment determines "which piece of work is performed among a plurality of pieces of work", as a work content at a time point when an image is captured. Details are described below.

One example of a functional block diagram of the image processing apparatus 10 according to the present example embodiment is illustrated in FIG. 1.

A determination unit 13 determines a work content, similarly to the first to third example embodiments. Then, in the determination of the work content described above, the determination unit 13 according to the present example embodiment determines which piece of work is performed among a plurality of pieces of work.

"A plurality of pieces of work" are previously defined. For example, disassembly, assembly, demounting of a component, mounting of a component, soldering, screw unfastening, screw fastening, an operation test, and the like are defined as a piece of work. Note that, the work exemplified herein is merely one example, and the present invention is not limited thereto.

The determination unit 13 can determine which piece of work is performed among a plurality of pieces of work, based on at least one (may be a plurality) of

- a relative position relation within an image between a detected hand of a person and a detected work target object,
- a kind of a detected work target object,
- an orientation of a detected work target object,
- a shape of a detected work target object,
- color information of a detected work target object,
- a position of a detected work target object within an image,
- a position of a detected hand of a person within an image,
- a shape of a detected hand of a person, and
- a kind of a tool held by a detected hand of a person.

According to a work content, “a relative position relation within an image between a detected hand of a person and a detected work target object”, for example, a distance between a hand of a person and a work target object within an image, a direction from a hand of a person toward a work target object within an image, a size of a region in which a hand of a person and a work target object overlap each other within an image, and the like can differ.

Moreover, according to a work content, “a kind of a detected work target object” can differ. For example, a kind of a target object may be classified by a kind of a substrate such as a substrate A and a substrate B, may be classified by a kind of an object such as a substrate, a housing, or a box, or may be classified by another method.

Moreover, according to a work content, “an orientation of a detected work target object within an image” can differ. For example, there is such a case that a work target object is raised when work A is performed, but a work target object is laid down when work B is performed. Moreover, there is such a case that a work target object is raised in such a way that a front surface of the work target object is directed toward a worker when work C is performed, but a work target object is raised in such a way that a back surface of the work target object is directed toward a worker when work D is performed.

Moreover, according to a work content, “a shape of a detected work target object” can differ. For example, a timing of performing each of pieces of work such as disassembly, assembly, demounting of a component, mounting of a component, soldering, screw unfastening, screw fastening, and an operation test is previously determined. That is to say, a piece of work such as disassembly, assembly, demounting of a component, mounting of a component, soldering, screw unfastening, screw fastening, or an operation test is previously determined to be performed at a stage where a work target object enters a predetermined state. Then, shapes of a work target object at stages where each piece of work is performed can differ from each other.

Moreover, according to a work content, “color information of a detected work target object” can differ. Color information may be information indicating a color that a work target object has, or may be information indicating a distribution of a color that a work target object has. For example, a timing of performing each of pieces of work such as disassembly, assembly, demounting of a component, mounting of a component, soldering, screw unfastening, screw fastening, and an operation test is previously determined. That is to say, a piece of work such as disassembly, assembly, demounting of a component, mounting of a component, soldering, screw unfastening, screw fastening, or an operation test is previously determined to be performed at a stage where a work target object enters a predetermined state. Then, pieces of color information of a work target object at stages where each piece of work is performed can differ from each other.

Moreover, according to a work content, “a position of a detected work target object within an image” can differ. For example, this situation can occur when an image is captured with a camera fixed in position and orientation, and when an arrangement position of a work target object differs according to a work content.

Moreover, according to a work content, a “position of a detected hand of a person within an image” can differ. For example, this situation can occur when an image is captured with a camera fixed in position and orientation, and when an arrangement position of a work target object differs according to a work content.

Moreover, according to a work content, “a shape of a detected hand of a person” can differ. A shape of a hand when each piece of work is performed tends to be the same shape. Then, a shape of a hand can differ for each piece of work.

Moreover, according to a work content, “a kind of a tool held by a detected hand of a person” can differ. During work, various tools such as a soldering iron, tweezers, a hammer, a magnifying glass, a driver, and a measure are utilized. Then, a kind of a tool to be utilized can differ for each piece of work. Note that, the kind of the tool exemplified herein is merely one example, and the present invention is not limited thereto.

As described above, according to a work content, “a relative position relation within an image between a detected hand of a person and a detected work target object”, “a kind of a detected work target object”, “an orientation of a detected work target object”, “a shape of a detected work target object”, “color information of a detected work target object”, “a position of a detected work target object within an image”, “a position of a detected hand of a person within an image”, “a shape of a detected hand of a person”, “a kind of a tool held by a detected hand of a person”, and the like can differ.

Accordingly, previously, when each of a plurality of pieces of work is performed, information indicating what state each of the pieces of work enters is generated, and is registered in the image processing apparatus 10. That is to say, information indicating “a relative position relation within an image between a hand of a person and a work target object when each of a plurality of pieces of work is performed”, “a kind of a work target object to be a target for each of a plurality of pieces of work”, “an orientation of a work target object within an image when each of a plurality of pieces of work is performed”, “a shape of a work target object when each of a plurality of pieces of work is performed”, “color information of a work target object when each of a plurality of pieces of work is performed”, “a position of a work target object within an image when each of a plurality of pieces of work is performed”, “a position of a hand of a person within an image when each of a plurality of pieces of work is performed”, “a shape of a hand of a person when each of a plurality of pieces of work is performed”, “a kind of a tool held by a hand of a person when each of a plurality of pieces of work is performed”, and the like is previously registered in the image processing apparatus 10.

Then, the determination unit 13 analyzes an image acquired by an acquisition unit 11, determines “a relative position relation within an image between a detected hand of a person and a detected work target object”, “a kind of a detected work target object”, “an orientation of a detected work target object”, “a shape of a detected work target object”, “color information of a detected work target object”, “a position of a detected work target object within an image", "a position of a detected hand of a person within an image", "a shape of a detected hand of a person", "a kind of a tool held by a detected hand of a person", and the like, then collates a result of the determination with the previously stored information described above, and determines whether which piece of work is performed among a plurality of pieces of work. A means for determining the content of the analysis of the image described above is not particularly limited, and any technique can be adopted.

Other components of the image processing apparatus 10 according to the present example embodiment are similar to those according to the first to third example embodiments.

The image processing apparatus 10 according to the present example embodiment achieves an advantageous effect similar to that according to the first to third example embodiments. Moreover, the image processing apparatus 10 according to the present example embodiment enables highly accurately determining which piece of work is performed among a plurality of pieces of work, at a time point when an image is captured.

Fifth Example Embodiment

An image processing apparatus 10 according to the present example embodiment includes a function of determining a work content at a time point when each of a plurality of time-series images is captured, and generating, based on a result of the determination, evaluation information indicating an evaluation content of work. Evaluation information generated by the image processing apparatus 10 according to the present example embodiment differs in content from evaluation information generated by the image processing apparatus 10 according to the third example embodiment. Details are described below.

FIG. 7 illustrates one example of a functional block diagram of the image processing apparatus 10 according to the present example embodiment. As illustrated, the image processing apparatus 10 includes an acquisition unit 11, a detection unit 12, a determination unit 13, and a generation unit 14.

The acquisition unit 11 acquires a plurality of time-series images. For example, the acquisition unit 11 may acquire a moving image being constituted of a plurality of time-series frame images. Otherwise, the acquisition unit 11 may acquire a plurality of time-series still images continuously captured at a predetermined time interval (example: every 1 second, every 10 seconds, every 30 seconds, every 1 minute, every 30 minutes, every 1 hour, or the like).

The detection unit 12 processes each of the plurality of time-series images, and detects a hand of a person and a work target object from each of the plurality of time-series images.

The determination unit 13 determines, based on a detection result of each of the plurality of time-series images in the detection unit 12, a work content at a time point when each of the plurality of time-series images is captured, specifically, which piece of work is performed among a plurality of pieces of work.

The generation unit 14 generates evaluation information indicating an evaluation content of work, based on a determination result of a content at a time point when each of the plurality of time-series images is captured, specifically, which piece of work is performed among a plurality of pieces of work. The generation unit 14 generates evaluation information indicating a total time in which a plurality of pieces of work is performed, based on a determination result of which piece of work is performed at a time point when each of the plurality of time-series images is captured.

Figure 9:
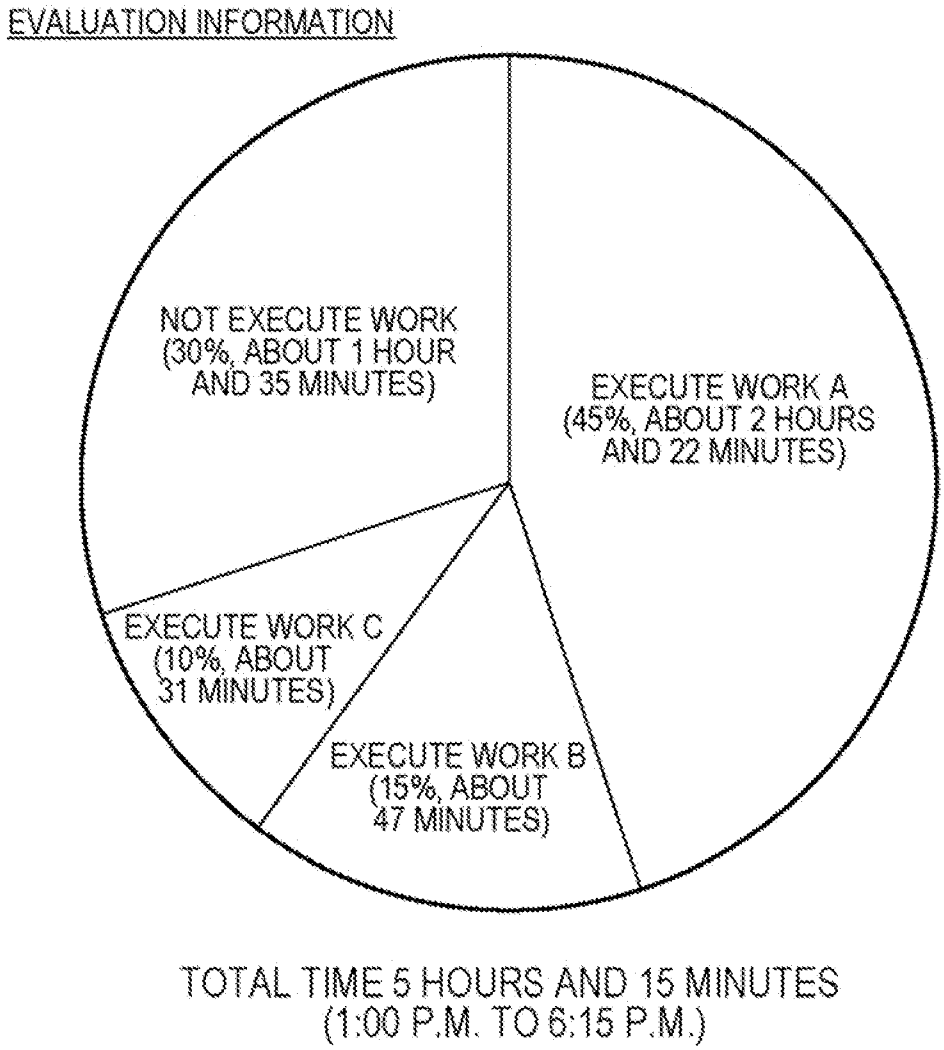
FIG. 9 is a diagram illustrating another example of evaluation information generated by the image processing apparatus.

FIG. 9 illustrates one example of evaluation information generated by the generation unit 14. The evaluation information illustrated in FIG. 9 indicates a time period (1:00 p.m. to 6:15 p.m.) of an evaluation target, and a total time thereof (5 hours and 15 minutes). A time period of an evaluation target can be determined to be any time period by a user. The generation unit 14 generates evaluation information, based on an analysis result of an image captured in a time period of an evaluation target.

Moreover, the evaluation information illustrated in FIG. 9 indicates a total time (work A: about 2 hours and 22 minutes, work B: about 47 minutes, work C: about 31 minutes) in which each of a plurality of pieces of work is performed, and a total time (about 1 hour and 35 minutes) in which work is not performed. Moreover, the evaluation information illustrated in FIG. 9 indicates a proportion (work A: 45%, work B: 15%, work C: 10%) of a time in which each of a plurality of pieces of work is performed and a proportion (30%) of a time in which work is not performed, to the total time (5 hours and 15 minutes) described above. Moreover, the evaluation information illustrated in FIG. 9 indicates, with a pie graph, a ratio (work A:work B:work C:work unexecuted=45:15:10:30) among a total time in which each of a plurality of pieces of work is performed and a total time in which work is not performed.

Figure 10:
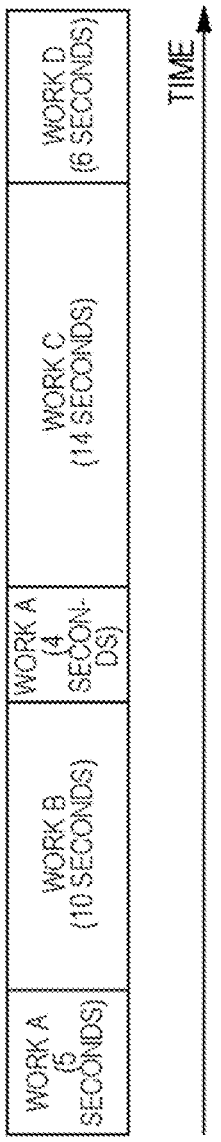
FIG. 10 is a diagram illustrating another example of evaluation information generated by the image processing apparatus.

FIG. 10 illustrates another example of evaluation information generated by the generation unit 14. The evaluation information illustrated in FIG. 10 indicates an order (time-series order) in which each of a plurality of pieces of work is performed, and a total time of each piece of work performed at each timing. Moreover, a size of a region allocated to each piece of work indicates a ratio of a total time of each piece of work performed at each timing.

Other components of the image processing apparatus 10 according to the present example embodiment are similar to those according to the first to fourth example embodiments.

The image processing apparatus 10 according to the present example embodiment achieves an advantageous effect similar to that according to the first to fourth example embodiments. Moreover, the image processing apparatus 10 according to the present example embodiment can generate evaluation information indicating a total time in which each of a plurality of pieces of work is performed, based on a determination result of a work content at a time point when each of a plurality of time-series images is captured. A user can recognize, based on the evaluation information, how much time a worker performs each of a plurality of pieces of work within a time period of an evaluation target.

Moreover, as illustrated in FIG. 9, the image processing apparatus 10 can also generate evaluation information indicating, with a pie graph, a ratio (work A:work B:work C:work unexecuted=45:15:10:30) among a total time in which each of a plurality of pieces of work is performed and a total time in which work is not performed. A user can recognize, based on the evaluation information, the ratio between a total time in which each of a plurality of pieces of work is performed and a total time in which work is not performed.

Moreover, as illustrated in FIG. 10, the image processing apparatus 10 can also generate evaluation information indicating an order (time-series order) in which each of a plurality of pieces of work is performed, and a total time of each piece of work performed at each timing. A user can recognize, based on the evaluation information, a flow of work, a time required for each piece of work performed at each timing, a ratio of a time required for each piece of work performed at each timing, and the like.

Sixth Example Embodiment

A state (appearance such as a shape, a size, or a color) of a work target object can change along with advance of work. When a work target object is detected from an image by an image analysis, an image of the work target object in each of all states needs to be registered as a reference image. However, the work is extremely troublesome. An image processing apparatus 10 according to the present example embodiment includes a function of extracting an image to be registered as a reference image, from among images in which a work target object is captured during work, and registering the extracted image. Details are described below.

Figure 11:
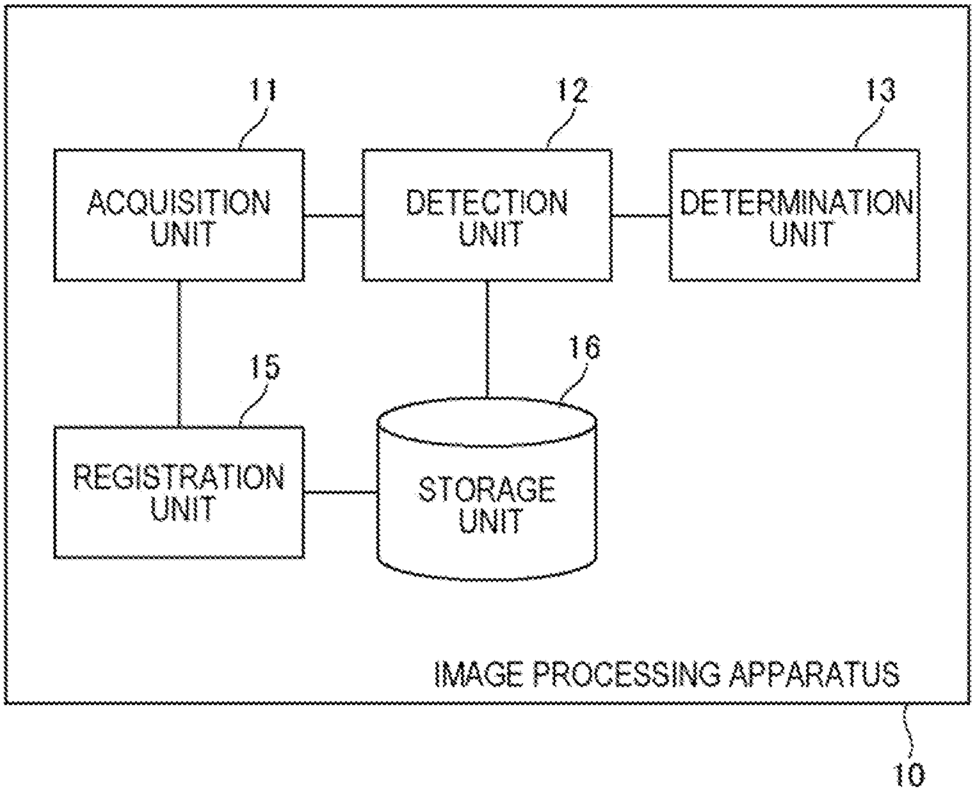
FIG. 11 is a diagram illustrating another example of a functional block diagram of the image processing apparatus.

FIG. 11 illustrates one example of a functional block diagram of the image processing apparatus 10 according to the present example embodiment. As illustrated, the image processing apparatus 10 includes an acquisition unit 11, a detection unit 12, a determination unit 13, a registration unit 15, and a storage unit 16. Note that, although not illustrated, the image processing apparatus 10 may include a generation unit 14.

The acquisition unit 11 acquires a plurality of time-series images in which a work target object is captured during work.

The registration unit 15 extracts an image satisfying a predetermined condition, from among images acquired by the acquisition unit 11. Then, the registration unit 15 newly registers the extracted image as a reference image. That is to say, the registration unit 15 stores the extracted image in the storage unit 16 as a reference image.

The predetermined condition includes at least one of

- a degree of similarly to a comparison target image computed based on at least one of a shape, a size, or color information of a work target object is less than a criterion value, and
- being captured at a predetermined timing.

When both conditions are included, a condition in which the conditions are connected by an AND condition or an OR condition can be the predetermined condition. Each of the two conditions described above is described below.

—A Degree of Similarly to a Comparison Target Image Computed Based on at Least One of a Shape, a Size, or Color Information of a Work Target Object is Less than a Criterion Value—

The "comparison target image" is, for example, an already registered reference image. Otherwise, the comparison target image may be an image captured before an image of a processing target among a plurality of time-series images. The "image of a processing target" is an image targeted for determination of whether the predetermined condition described above is satisfied, among a plurality of time-series images acquired by the acquisition unit 11.

For example, the comparison target image may be an image (image immediately before an image of a processing target in a time-series order) captured immediately before an image of a processing target, or may be an image captured before an image of a processing target and captured at a timing most proximate to an image of the processing target among images registered as reference images. A computation method of a degree of similarly is not particularly limited, and any technique can be adopted.

An image that does not resemble the comparison target image at equal to or more than a predetermined level satisfies the condition.

—Being Captured at a Predetermined Timing—

The predetermined timing may be a timing of, for example, every predetermined time (example: every 30 seconds, every 1 minute, every 5 minutes, every 15 minutes, or the like) from any start time point.

Otherwise, the predetermined timing may be a timing when a position of a work target object within an image changes. There is a case where, during work, a worker moves a position of a work target object according to work advancement. For example, such a case can occur that, in order to perform work A for a work target object in a certain state, the work target object is positioned at a position suited to the work A, and, in order to perform work B for the work target object in another certain state, the work target object is positioned at a position suited to the work B. Accordingly, an image captured at a timing when a position of a work target object within an image has changed is registered as a reference image.

A "change of a position of a work target object within an image" may be determined based on a comparison result between a position of a work target object within an image of a processing target and a position of the work target object within an image captured before the image of the processing target and registered as a reference image. For example, when a difference between the two positions described above is larger than a threshold value, it may be determined that the position of the work target object within the image has changed.

Otherwise, the predetermined timing may be a timing when a predetermined event is detected within sensing data of a pressure sensor installed on a table on which a work target object is put. The predetermined event is, for example, an event in which "a data value at a timing when an image of a processing target is captured" and "a data value at capture of an image captured before an image of the processing target and captured at a timing most proximate to an image of the processing target among images registered as reference images" satisfy an extraction condition.

The extraction condition defines that two data values are separate equal to or more than a criterion. For example, the extraction condition may be a condition that a difference between two data values is equal to or more than a criterion value, or may have another content.

Note that, sensing data of a pressure sensor include date and time information indicating a sensing timing of each data value. An image captured at a timing when a predetermined event is detected within sensing data of the pressure sensor can be determined by utilizing the date and time information, and date and time information indicating a capture date and time given to an image acquired by the acquisition unit 11.

Otherwise, the predetermined timing may be a timing when a predetermined sound is detected within sound data recorded during work. During work, various sounds are emitted, such as a sound of a tool or a machine. An image captured at a timing when a predetermined sound previously registered in the image processing apparatus 10 among various such sounds is detected is registered as a reference image.

Otherwise, the predetermined timing may be a timing when a predetermined keyword is detected within sound data recorded during work. When a state of a work target object becomes, during work, a state of being preferably registered as a reference image, a worker speaks a predetermined keyword (example: "register"). Then, an image captured at a timing when this speech is made is registered as a reference image.

Note that, sound data include date and time information indicating a timing of each speech or each sound. An image captured at a timing when a predetermined sound is emitted, or a timing when a predetermined keyword is spoken can be determined by utilizing the date and time information, and date and time information indicating a capture date and time given to an image acquired by the acquisition unit 11.

Otherwise, the predetermined timing may be a timing when a predetermined action by a worker is detected within an image. When a state of a work target object becomes, during work, a state of being preferably registered as a reference image, a worker performs a predetermined action (example: "an action of making a predetermined pose with a hand"). Then, an image in which the action is detected, or an image captured immediately before or immediately after an image in which the action is detected is registered as a reference image.

Otherwise, the predetermined timing may be a timing when another predetermined action by a worker is detected within an image. During work, a worker performs various actions such as taking a thing (a part, a tool, or the like) or putting a thing. An image in which a predetermined action previously registered in the image processing apparatus 10 among various such actions is detected, or an image captured immediately before or immediately after an image in which the action is detected is registered as a reference image.

Note that, the registration unit 15 may newly register, as a reference image, "an image in which a work target object does not overlap a hand of a person", or "an image in which a work target object overlaps a hand of a person, but an extent of the overlap is smaller than a criterion (a size of an overlapping area is smaller than a previously determined criterion value)", among images satisfying a predetermined condition as described above. In this way, an image in which a work target object is not hidden by a hand of a person (or a hidden part is small) can be registered as a reference image.

The detection unit 12 detects, based on a reference image of a work target object previously registered in the storage unit 16, the work target object from an image acquired by the acquisition unit 11. For example, the detection unit 12 performs matching of a keypoint between the image acquired by the acquisition unit 11 and the reference image. Then, the detection unit 12 detects, based on a result of the matching, the work target object from the image acquired by the acquisition unit 11.

Other components of the image processing apparatus 10 according to the present example embodiment are similar to those according to the first to fifth example embodiments.

The image processing apparatus 10 according to the present example embodiment achieves an advantageous effect similar to that according to the first to fifth example embodiments. Moreover, the image processing apparatus 10 according to the present example embodiment can extract an image to be registered as a reference image, from among images in which a work target object is captured during work, and register the extracted image. As a result, work of registering, as a reference image, an image of a work target object in any state can be efficiently performed.

Moreover, the image processing apparatus 10 according to the present example embodiment can register, as a reference image, an image extracted by a characteristic method as described above. As a result, a disadvantage of redundantly registering, as a reference image, an image of a work target object in the same state, or a disadvantage such as missing of registration of an image of a work target object in a state of not yet being registered can be suppressed.

Seventh Example Embodiment

An image processing apparatus 10 according to the present example embodiment performs both "determination of a work content at a time point when an image is captured" and "new registration of a reference image", by use of the image acquired by an acquisition unit 11. Details are described below.

One example of a functional block diagram of the image processing apparatus 10 according to the present example embodiment is illustrated in FIG. 11.

Figure 12:
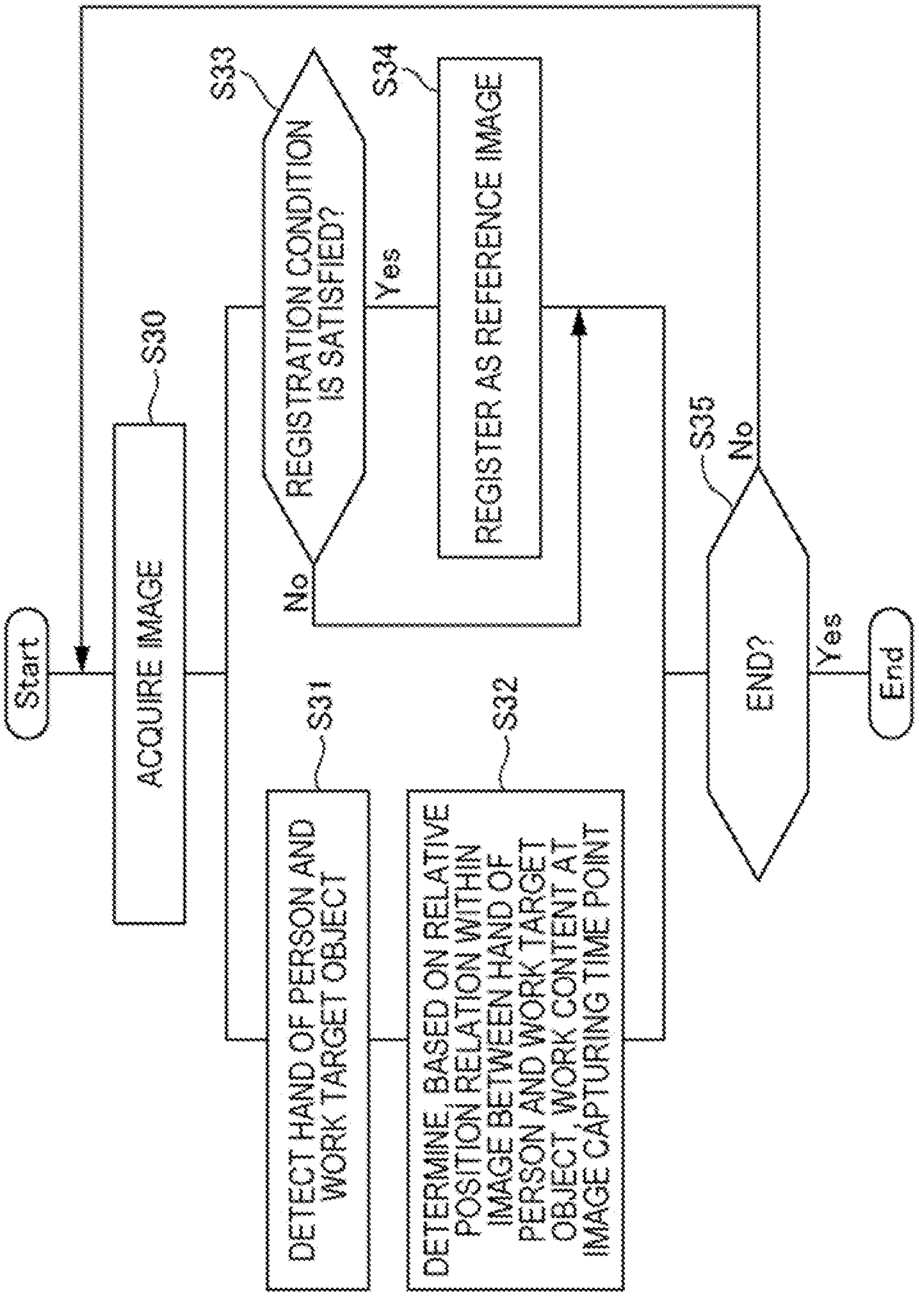
FIG. 12 is a flowchart illustrating another example of a flow of processing in the image processing apparatus.

One example of a flow of processing in the image processing apparatus 10 according to the present example embodiment is described by use of a flowchart in FIG. 12.

When an image is acquired (S30), the image processing apparatus 10 detects a hand of a person and a work target object from the image (S31). Then, the image processing apparatus 10 determines a work content at a time point when the image is captured, based on a relative position relation within the image between the detected hand of the person and the detected work target object (S32).

Moreover, the image processing apparatus 10 determines whether the image acquired in S30 satisfies a registration condition (S33). The "registration condition" may be a "predetermined condition" described in the sixth example embodiment. Otherwise, the "registration condition" may be satisfaction of the "predetermined condition" described in the sixth example embodiment, and satisfaction of "a work target object does not overlap a hand of a person", or "a work target object overlaps a hand of a person, but an extent of the overlap is smaller than a criterion".

When the registration condition is satisfied (Yes in S33), the image processing apparatus registers, as a reference image, the image acquired in S30 (S34). That is to say, the image processing apparatus 10 stores the image acquired in S30, in a storage unit 16 as a reference image.

On the other hand, when the registration condition is not satisfied (No in S33), the image processing apparatus 10 does not register, as a reference image, the image acquired in S30. That is to say, the image processing apparatus 10 does not store the image acquired in S30, in the storage unit 16 as a reference image.

Other components of the image processing apparatus 10 according to the present example embodiment are similar to those according to the first to sixth example embodiments.

The image processing apparatus 10 according to the present example embodiment achieves an advantageous effect similar to that according to the first to sixth example embodiments. Moreover, the image processing apparatus 10 according to the present example embodiment can perform, by use of an image acquired by the acquisition unit 11, both "determination of a work content at a time point when an image is captured" and "new registration of a reference image". That is to say, while performing processing of determining a work content at a time point when an image is captured, the image processing apparatus 10 can perform, in parallel therewith, processing of newly registering a reference image. As a result, a reference image can be efficiently increased.

Eighth Example Embodiment

As described in the sixth example embodiment, a state (appearance such as a shape, a size, or a color) of a work target object can change along with advance of work. Thus, when a work target object is detected from an image by an image analysis, an image of the work target object in each of all states needs to be registered as a reference image. As a result, the number of reference images to be registered increases. When a work target object is detected from an image, collating the image with all reference images increases a processing load of a computer, and a time required for processing.

Accordingly, an image processing apparatus 10 according to the present example embodiment extracts some suitable reference images from among preliminarily registered reference images, collates the extracted some reference images with an image acquired by an acquisition unit 11, and detects a work target object from the image. Details are described below.

One example of a functional block diagram of the image processing apparatus 10 according to the present example embodiment is illustrated in FIG. 1, 7, or 11.

The acquisition unit 11 acquires a plurality of time-series images. For example, the acquisition unit 11 may acquire a moving image being constituted of a plurality of time-series frame images. Otherwise, the acquisition unit 11 may acquire a plurality of time-series still images continuously captured at a predetermined time interval (example: every 1 second, every 10 seconds, every 30 seconds, every 1 minute, every 30 minutes, every 1 hour, or the like).

A detection unit 12 detects a hand of a person from the plurality of time-series images. Moreover, the detection unit 12 detects a work target object from each of the plurality of time-series images, based on a previously registered reference image of the work target object. The detection unit 12 detects a work target object from an image of a processing target by utilizing some of a plurality of reference images. An "image of a processing target" according to the present example embodiment is an image targeted for processing of detecting a work target object.

Herein, an example of processing of extracting some reference images to be utilized from among a plurality of reference images is described.

First Example

This example is utilized when a state (appearance such as a shape, a size, or a color) of a work target object changes along with advance of work (along with elapse of time) in a predetermined order. For example, this example is utilized when transition of a state of a work target object along with advance of work is previously determined in such a way that the state of the work target object becomes a first state, the state of the work target object then becomes a second state, and, thereafter, the state of the work target object becomes a third state.

Then, information indicating the transition of the state of the work target object along with advance of the work is stored in the image processing apparatus 10. Moreover, information (association information) associating each of a plurality of reference images with information indicating a state of a work target object captured in each of the reference images is previously stored in the image processing apparatus 10.

The detection unit 12 determines, based on a reference image utilized when a work target object is detected from an image before an image of a processing target in a time-series order, a reference image to be utilized when a work target object is detected from an image of the processing target.

For example, the detection unit 12 determines a state of a work target object being associated with a reference image utilized when a work target object is detected from an image before (e.g., immediately before) an image of a processing target in a time-series order, and a state of a work target object appearing immediately thereafter. Then, the detection unit 12 determines a reference image in which a work target object in a determined state is captured, as a reference image to be utilized when a work target object is detected from an image of a processing target.

Second Example

This example is also utilized when a state (appearance such as a shape, a size, or a color) of a work target object changes along with advance of work (along with elapse of time) in a predetermined order.

In this example, information (transition information) indicating transition of a state of a work target object along with advance of the work is previously stored in the image processing apparatus 10. Moreover, information (aim time information) indicating an aim time from a time when the work target object enters a certain state to a time when the work target object enters a next state is previously stored in the image processing apparatus 10. Further, information (association information) associating each of a plurality of reference images with information indicating a state of a work target object captured in each of the reference images is previously stored in the image processing apparatus 10.

In this example, the detection unit 12 determines a reference image to be utilized, according to an elapsed time from a predetermined timing. In this example, a user specifies a reference image to be utilized in order to detect a work target object from an image captured at a predetermined timing.

The "predetermined timing" is, for example, a time point when processing of determining a work content starts, or any timing at or after the start time point. A user visually recognizes an image captured at the predetermined timing, and, when recognizing a state of a work target object captured in the image, specifies a reference image to be utilized for detection of the work target object in the state.

Although there are various means for accepting specification of a reference image, a means for accepting specification of a reference image may be, for example, a means for displaying a list of reference images of a work target object in a plurality of states, and causing a reference image in a state resembling a state of a work target object captured in an image captured at the predetermined timing to be specified.

Then, after determining a reference image to be utilized at the predetermined timing, the detection unit 12 changes a reference image to be utilized, according to an elapsed time from the predetermined timing. Specifically, first, after determining a reference image to be utilized at the predetermined timing, the detection unit 12 determines, based on the association information described above, a state of a work target object captured in the determined reference image. Subsequently, the detection unit 12 determines, based on the transition information and aim time information described above, a state of the work target object appearing after the determined state of the work target object, and a time required until then. Then, the detection unit 12 changes, according to a fact that the elapsed time from the predetermined timing has elapsed the determined time, a reference image to be utilized, to a reference image being associated with a state of a work target object appearing after the determined state of the work target object. Note that, at a time before and after the elapsed time from the predetermined timing becomes the determined time, both a reference image being associated with a state of the work target object appearing before the time, and a reference image being associated with a state of the work target object appearing thereafter may be utilized.

Figure 13:
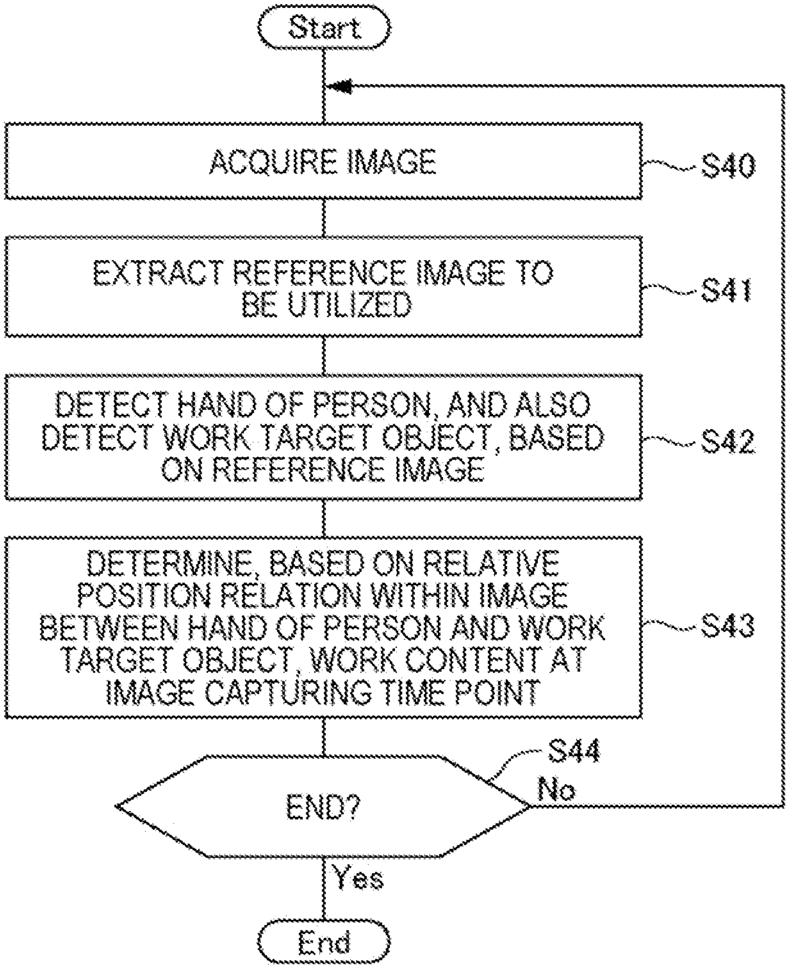
FIG. 13 is a flowchart illustrating another example of a flow of processing in the image processing apparatus.

Next, one example of a flow of processing in the image processing apparatus 10 is described by use of a flowchart in FIG. 13.

When an image is acquired (S40), the image processing apparatus 10 extracts a reference image to be utilized for detection of a work target object from a reference image stored in a storage unit 16 (S41). Thereafter, the image processing apparatus 10 detects a hand of a person from the image acquired in S40, and also detects a work target object from the image acquired in S40, by collation between the reference image extracted in S41 and the image acquired in S40 (S42). Then, the image processing apparatus 10 determines a work content at a time point when the image is captured, based on a relative position relation within the image between the detected hand of the person and the detected work target object (S43).

Other components of the image processing apparatus 10 according to the present example embodiment are similar to those according to the first to seventh example embodiments.

The image processing apparatus 10 according to the present example embodiment achieves an advantageous effect similar to that according to the first to seventh example embodiments. Moreover, the image processing apparatus 10 according to the present example embodiment extracts some suitable reference images from among preliminarily registered reference images, collates the extracted some reference images with an image acquired by the acquisition unit 11, and detects a work target object from the image. Such an image processing apparatus 10 according to the present example embodiment can reduce a processing load of a computer.

Ninth Example Embodiment

In one example according to the second to eighth example embodiments, when at least one of a hand of a person and a work target object is not detected, a determination unit 13 determines that work is not performed at a time point when the image is captured.

Incidentally, when a size of a work target object is smaller than a hand of a person, there is a case where the work target object is hidden by the hand of the person during work. In such a case, a work target object is not detected from an image, and, according to the configuration described above, the determination unit 13 determines that work is not performed at a time point when the image is captured. However, the determination is not proper. An image processing apparatus 10 according to the present example embodiment includes a means for solving the disadvantage. Details are described below.

One example of a functional block diagram of the image processing apparatus 10 according to the present example embodiment is illustrated in FIG. 1, 7, or 11.

When a plurality of time-series images acquired by an acquisition unit 11 are observed in a time-series order, and one or N or less continuous "images in which a hand of a person is detected, but a work target object is not detected" is between "images in which both a hand of a person and a work target object are detected", the determination unit 13 handles assuming that a work target object is also detected in one or N or less continuous "images in which a hand of a person is detected, but a work target object is not detected". N is an integer equal to or more than 3, and can be determined, based on, for example, a time interval or the like between two images being continuous in a time-series order.

Then, the determination unit 13 determines that work is performed at a time point when the one or N or less continuous "images in which a hand of a person is detected, but a work target object is not detected" are captured.

Other components of the image processing apparatus 10 according to the present example embodiment are similar to those according to the first to eighth example embodiments.

The image processing apparatus 10 according to the present example embodiment achieves an advantageous effect similar to that according to the first to eighth example embodiments. Moreover, the image processing apparatus 10 according to the present example embodiment can suppress a disadvantage of erroneously determining that work is not performed, when a work target object is hidden by a hand of a person.

While the example embodiments of the present invention have been described above with reference to the drawings, the example embodiments are exemplifications of the present invention, and various configurations other than those described above can also be adopted. The configurations according to the example embodiments described above may be combined with each other, or some of the configurations may be replaced with other configurations. Moreover, various modifications may be made to the configuration according to the example embodiments described above within a scope that does not depart from the spirit thereof. Moreover, the configurations and pieces of processing disclosed in each of the example embodiments and modified examples described above may be combined with each other.

Moreover, although a plurality of processes (pieces of processing) are described in order in a plurality of flowcharts used in the above description, an execution order of the processes executed in each of the example embodiments is not limited to the described order. In each of the example embodiments, an order of the illustrated processes may be changed to an extent that causes no problem in terms of content. Moreover, each of the example embodiments described above can be combined to an extent that content does not contradict.

Some or all of the above-described example embodiments can also be described as, but are not limited to, the following supplementary notes.

1. An image processing apparatus including:
   - an acquisition unit that acquires an image;
   - a detection unit that detects a hand of a person and a work target object from the image; and
   - a determination unit that determines, based on a relative position relation within the image between the detected hand of the person and the detected work target object, a work content at a time point when the image is captured.
2. The image processing apparatus according to supplementary note 1, wherein
   - the acquisition unit acquires a plurality of the time-series images,
   - the detection unit detects a hand of a person and the work target object from each of a plurality of the time-series images, and the determination unit determines the work content at a time point when each of a plurality of the time-series images is captured, the image processing apparatus further including a generation unit that generates evaluation information indicating an evaluation content of work, based on a determination result of the work content at a time point when each of a plurality of the time-series images is captured.

3. The image processing apparatus according to supplementary note 2, wherein the evaluation information indicates at least one of a total time in which work is performed, and a total time in which work is not performed.

4. The image processing apparatus according to supplementary note 2 or 3, wherein the evaluation information indicates a total time in which each of a plurality of pieces of work is performed.

5. The image processing apparatus according to any one of supplementary notes 1 to 4, wherein the determination unit determines, in the determination of the work content, whether work is performed.

6. The image processing apparatus according to supplementary note 5, wherein, when a detected hand of a person overlaps the detected work target object, the determination unit determines that work is performed.

7. The image processing apparatus according to any one of supplementary notes 1 to 6, wherein the determination unit determines, in the determination of the work content, which piece of work is performed among a plurality of pieces of work.

8. The image processing apparatus according to supplementary note 7, wherein the determination unit determines which piece of work is performed among a plurality of pieces of work, based on at least one of a relative position relation within the image between a detected hand of a person and the detected work target object, a kind of the detected work target object, an orientation of the detected work target object, a shape of the detected work target object, color information of the detected work target object, a position of the detected work target object within the image, a position of a detected hand of a person within the image, a shape of a detected hand of a person, and a kind of a tool held by a detected hand of a person.

9. The image processing apparatus according to any one of supplementary notes 1 to 8, wherein the detection unit detects the work target object from the image, based on a previously registered reference image of the work target object, and the image processing apparatus further including a registration unit that newly registeres, as the reference image, the image satisfying a predetermined condition.

10. The image processing apparatus according to supplementary note 9, wherein the predetermined condition includes a condition that a degree of similarly to a comparison target image computed based on at least one of a shape, a size, or color information of the work target object is less than a criterion value.

11. The image processing apparatus according to supplementary note 9, wherein the predetermined condition is being captured at a predetermined timing.

12. The image processing apparatus according to supplementary note 11, wherein the predetermined timing includes at least one of a timing when a position of the work target object within the image changes, a timing when a predetermined event is detected within sensing data of a pressure sensor installed on a table on which a work target object is put, a timing when a predetermined sound is detected within sound data recorded during work, a timing when a predetermined keyword is detected within sound data recorded during work, and a timing when a predetermined action by a worker is detected within the image.

13. The image processing apparatus according to supplementary note 9, wherein the registration unit newly registers, as the reference image, an image in which the work target object does not overlap the hand of the person, or an image in which a work target object overlaps the hand of the person, but an extent of the overlap is smaller than a criterion, among the images satisfying the predetermined condition.

14. The image processing apparatus according to any one of supplementary notes 1 to 13, wherein the acquisition unit acquires a plurality of the time-series images, the detection unit detects a hand of a person from each of a plurality of the time-series images, and also detects the work target object, based on a previously registered reference image of the work target object, and the detection unit detects the work target object from the image of a processing target by utilizing some of a plurality of the reference images, and determines, based on the reference image utilized when the work target object is detected from the image before the image of a processing target in a time-series order, the reference image to be utilized when the work target object is detected from the image of the processing target.

15. An image processing method including, by one or more computers:

acquiring an image;

detecting a hand of a person and a work target object from the image; and determining, based on a relative position relation within the image between the detected hand of the person and the detected work target object, a work content at a time point when the image is captured.

16. A program causing a computer to function as:

an acquisition unit that acquires an image;

a detection unit that detects a hand of a person and a work target object from the image; and a determination unit that determines, based on a relative position relation within the image between the detected hand of the person and the detected work target object, a work content at a time point when the image is captured.

10 Image processing apparatus

11 Acquisition unit

12 Detection unit

13 Determination unit
14 Generation unit
15 Registration unit
16 Storage unit
1A Processor
2A Memory
3A Input/output I/F
4A Peripheral circuit
5A Bus

The invention claimed is:

1. An image processing apparatus comprising:
at least one memory configured to store one or more instructions; and
at least one processor configured to execute the one or more instructions to:
acquire an image;
detect a hand of a person and a work target object from the image; and
determine, based on a relative position relation within the image between the detected hand of the person and the detected work target object, a work content at a time point when the image is captured, wherein the work target object is a physical object.

2. The image processing apparatus according to claim 1, wherein the processor is further configured to execute the one or more instructions to:
acquire a plurality of the time-series images;
detect the hand of the person and the work target object from each of a plurality of the time-series images;
determine the work content at a time point when each of a plurality of the time-series images is captured; and
generate evaluation information indicating an evaluation content of work, based on a determination result of the work content at a time point when each of a plurality of the time-series images is captured.

3. The image processing apparatus according to claim 2, wherein
the evaluation information indicates at least one of a total time in which work is performed, and a total time in which work is not performed.

4. The image processing apparatus according to claim 2, wherein
the evaluation information indicates a total time in which each of a plurality of pieces of work is performed.

5. The image processing apparatus according to claim 1, wherein
the processor is further configured to execute the one or more instructions to determine, in the determination of the work content, whether work is performed.

6. The image processing apparatus according to claim 5, wherein,
the processor is further configured to execute the one or more instructions to determine that work is performed, when the detected hand of the person overlaps the detected work target object.

7. The image processing apparatus according to claim 1, wherein
the processor is further configured to execute the one or more instructions to determine, in the determination of the work content, which piece of work is performed among a plurality of pieces of work.

8. The image processing apparatus according to claim 7, wherein
the processor is further configured to execute the one or more instructions to determine which piece of work is performed among a plurality of pieces of work, based on at least one of:
a relative position relation within the image between the detected hand of the person and the detected work target object,
a kind of the detected work target object,
an orientation of the detected work target object,
a shape of the detected work target object,
color information of the detected work target object,
a position of the detected work target object within the image,
a position of the detected hand of the person within the image,
a shape of the detected hand of the person, and
a kind of a tool held by the detected hand of the person.

9. The image processing apparatus according to claim 1, wherein the processor is further configured to execute the one or more instructions to:
detect the work target object from the image, based on a previously registered reference image of the work target object; and
newly register, as the reference image, the image satisfying a predetermined condition.

10. The image processing apparatus according to claim 9, wherein
the predetermined condition includes a condition that a degree of similarly to a comparison target image computed based on at least one of a shape, a size, or color information of the work target object is less than a criterion value.

11. The image processing apparatus according to claim 9, wherein
the predetermined condition is being captured at a predetermined timing.

12. The image processing apparatus according to claim 11, wherein
the predetermined timing includes at least one of:
a timing when a position of the work target object within the image changes,
a timing when a predetermined event is detected within sensing data of a pressure sensor installed on a table on which a work target object is put,
a timing when a predetermined sound is detected within sound data recorded during work,
a timing when a predetermined keyword is detected within sound data recorded during work, and
a timing when a predetermined action by a worker is detected within the image.

13. The image processing apparatus according to claim 9, wherein
the processor is further configured to execute the one or more instructions to newly register, as the reference image, an image in which the work target object does not overlap the hand of the person, or an image in which a work target object overlaps the hand of the person, but an extent of the overlap is smaller than a criterion, among the images satisfying the predetermined condition.

14. The image processing apparatus according to claim 1, wherein the processor is further configured to execute the one or more instructions to:
acquire a plurality of the time-series images;
detect the hand of the person from each of a plurality of the time-series images, and also detect the work target object, based on a previously registered reference image of the work target object;

in the detection of the work target object:

detect the work target object from the image of a processing target by utilizing some of a plurality of the reference images, images; and determine, based on the reference image utilized when the work target object is detected from the image before the image of a processing target in a time-series order, the reference image to be utilized when the work target object is detected from the image of the processing target.

15. An image processing method comprising, by one or more computers:

acquiring an image;

detecting a hand of a person and a work target object from the image; and determining, based on a relative position relation within the image between the detected hand of the person and the detected work target object, a work content at a time point when the image is captured, wherein the work target object is a physical object.

16. A non-transitory storage medium storing a program causing a computer to:

acquire an image;

detect a hand of a person and a work target object from the image; and determine, based on a relative position relation within the image between the detected hand of the person and the detected work target object, a work content at a time point when the image is captured, wherein the work target object is a physical object.

17. The image processing apparatus according to claim 1, wherein the work target object is the physical object acted upon by at least one work operation performed by the detected hand.

18. The image processing method according to claim 15, wherein the work target object is the physical object acted upon by at least one work operation performed by the detected hand.

19. The non-transitory storage medium according to claim 16, wherein the work target object is the physical object acted upon by at least one work operation performed by the detected hand.

* * * * *